(12) United States Patent  
Shiraishi et al.

(10) Patent No.: US 8,699,180 B2
(45) Date of Patent: Apr. 15, 2014

(54) MOTOR AND DISK DRIVE APPARATUS

(71) Applicant: Nidec Corporation, Kyoto (JP)

(72) Inventors: Masahiro Shiraishi, Kyoto (JP);
Kazuhiro Sato, Kyoto (JP); Katsuya Takahashi, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/783,733

(22) Filed: Mar. 4, 2013

(65) Prior Publication Data

US 2013/0342934 A1 Dec. 26, 2013

Related U.S. Application Data

(60) Provisional application No. 61/663,114, filed on Jun. 22, 2012.

(51) Int. Cl.
*G11B 19/20* (2006.01)
(52) U.S. Cl.
USPC .................................................. 360/99.08
(58) Field of Classification Search
USPC .................................................. 360/99.08
See application file for complete search history.

(56) References Cited

U.S. PATENT DOCUMENTS

| | | | | |
|---|---|---|---|---|
| 5,243,481 | A * | 9/1993 | Dunckley et al. | 360/99.08 |
| 5,844,748 | A * | 12/1998 | Dunfield et al. | 360/99.08 |
| 6,771,459 | B1 * | 8/2004 | Komura et al. | 360/99.08 |
| 7,012,191 | B1 | 3/2006 | Watanabe et al. | |
| 7,122,922 | B2 * | 10/2006 | Xu et al. | 310/51 |
| 8,120,872 | B2 | 2/2012 | Sekii et al. | |
| 8,223,455 | B2 * | 7/2012 | Iguchi et al. | 360/99.08 |
| 8,363,352 | B2 | 1/2013 | Kang | |
| 2006/0138886 | A1 | 6/2006 | Ito et al. | |
| 2006/0265871 | A1 | 11/2006 | Ito et al. | |
| 2007/0211375 | A1 * | 9/2007 | Iguchi et al. | 360/99.08 |
| 2007/0247010 | A1 | 10/2007 | Ichizaki | |

(Continued)

FOREIGN PATENT DOCUMENTS

| | | |
|---|---|---|
| JP | 05-207717 A | 8/1993 |
| JP | 05-070184 U | 9/1993 |

(Continued)

OTHER PUBLICATIONS

Sekii et al., "Motor and Disk Drive Apparatus", U.S. Appl. No. 13/564,934, filed Aug. 2, 2012.

(Continued)

*Primary Examiner* — Mark Blouin
(74) *Attorney, Agent, or Firm* — Keating & Bennett, LLP

(57) ABSTRACT

A spindle motor arranged to rotate a disk about a center axis extending in an up-down direction includes a rotary unit including a rotor magnet and a stationary unit including a stator opposed to the rotor magnet and a base plate. The base plate includes a flat plate-shaped member positioned around the center axis and made of a first kind of metallic material and a base body axially overlapping with the plate-shaped member and made of a second kind of metallic material. The first kind of metallic material is larger in Young's modulus than the second kind of metallic material. The base body includes a cylindrical or substantially cylindrical bearing attachment portion axially extending about the center axis and a bottom plate portion radially extending from a lower portion of the bearing attachment portion. The plate-shaped member is positioned below the bottom plate portion to contact the bottom plate portion.

18 Claims, 8 Drawing Sheets

(56) References Cited

U.S. PATENT DOCUMENTS

| | | |
|---|---|---|
| 2007/0278880 A1 | 12/2007 | Wada et al. |
| 2008/0019038 A1 | 1/2008 | Xu et al. |
| 2008/0084142 A1 | 4/2008 | Ino et al. |
| 2010/0177627 A1 | 7/2010 | Ino et al. |
| 2012/0200957 A1 | 8/2012 | Yawata |

FOREIGN PATENT DOCUMENTS

| | | |
|---|---|---|
| JP | 05-316704 A | 11/1993 |
| JP | 06-343242 A | 12/1994 |
| JP | 08-033253 A | 2/1996 |
| JP | 08-237899 A | 9/1996 |
| JP | 08-275439 A | 10/1996 |
| JP | 10-108424 A | 4/1998 |
| JP | 2003-153481 A | 5/2003 |
| JP | 2005-253239 A | 9/2005 |
| JP | 2007-295666 A | 11/2007 |
| JP | 2008-005588 A | 1/2008 |
| JP | 2008-092714 A | 4/2008 |
| JP | 2009-110611 A | 5/2009 |
| JP | 2011-114892 A | 6/2011 |
| JP | 2012-005339 A | 1/2012 |

OTHER PUBLICATIONS

Saeki et al., "Spindle Motor and Disk Drive Apparatus", U.S. Appl. No. 13/767,228, filed Feb. 14, 2013.

Saeki et al.,"Base Unit", U.S. Appl. No. 13/770,374, filed Feb. 19, 2013.

Fujinawa et al., "Base Member, Motor, and Disk Drive Apparatus", U.S. Appl. No. 13/770,395, filed Feb. 19, 2013.

Matsumoto et al., "Base Unit, Motor and Disk Drive Apparatus", U.S. Appl. No. 13/770,355, filed Feb. 19, 2013.

Saeki et al., "Stopper, Motor, and Disk Drive Apparatus", U.S. Appl. No. 13/767,194, filed Feb. 14, 2013.

Masumi et al., "Base Plate, Base Unit, Motor, Disk Drive Apparatus and Method of Manufacturing the Base Plate", U.S. Appl. No. 13/789,974, filed Mar. 8, 2013.

Tatsumi et al., "Base Plate, Base Unit, Motor and Disk Apparatus", U.S. Appl. No. 13/788,140, filed Mar. 7, 2013.

Tamaoka et al., "Motor and Disk Drive Apparatus", U.S. Appl. No. 13/564,900, filed Aug. 2, 2012.

Sato et al., "Spindle Motor and Disk Drive Apparatus", U.S. Appl. No. 13/780,447, filed Feb. 28, 2013.

Matsumoto et al., "Spindle Motor and Disk Drive Apparatus", U.S. Appl. No. 13/792,448, filed Mar. 11, 2013.

Matsumoto et al., "Spindle Motor and Disk Drive Apparatus", U.S. Appl. No. 13/792,400, filed Mar. 11, 2013.

Matsumoto et al., "Base Unit, Motor and Disk Drive Apparatus", U.S. Appl. No. 13/785,194, filed Mar. 5, 2013.

Matsumoto et al.,"Spindle Motor and Disk Drive Apparatus", U.S. Appl. No. 13/798,842, filed Mar. 13, 2013.

Sato et al., "Spindle Motor and Disk Drive Apparatus", U.S. Appl. No. 13/798,827, filed Mar. 13, 2013.

Ishino et al., "Motor and Disk Drive Apparatus", U.S. Appl. No. 13/794,864, filed Mar. 12, 2013.

* cited by examiner

MOTOR AND DISK DRIVE APPARATUS

BACKGROUND OF THE INVENTION

1. Field of the Invention

The present invention relates to a motor and a disk drive apparatus.

2. Description of the Related Art

Conventionally, a disk drive apparatus such as a hard disk drive apparatus or the like is equipped with a spindle motor for rotating a disk. The disk drive apparatus includes a disk, a housing, a stator, a FPC (Flexible Printed Circuit), and so forth. The housing includes a cover, a base plate, and so forth.

In recent years, the disk drive apparatus is required to become smaller in height and size. Particularly, in order to further reduce the height of a 2.5 inch type disk drive apparatus having a thickness of 7 mm or less, which belongs to small-size disk drive apparatuses, it is necessary to reduce the thickness of a housing or a motor arranged within the housing. In general, the motor includes a rotor hub, coils, a stator core, a wiring substrate, a base plate, etc. When assembling the motor, these components are arranged to axially overlap with one another. For the sake of reducing the thickness of the motor, these components need to be made thin. However, if an attempt is made to reduce the overall height of the motor by reducing the turn number of the coils or the lamination thickness of the stator core, the magnetic flux generated in the stator during the operation of the motor becomes reduced such that the torque constant is reduced. It is therefore impossible to obtain the torque required to rotate the disk attached to the rotor hub.

In order to reduce the height of the motor, it is therefore necessary to pay attention to, among the components of the motor, the base plate which dominates a large portion of the axial dimension of the motor. However, if the base plate is merely made thin, the rigidity of the base plate is reduced to a great extent. As a result, if a shocking force is applied from the outside to the base plate, it is likely that the base plate will be broken and that the disk arranged within the housing will be damaged.

Accordingly, a demand has existed for a structure capable of increasing the rigidity of the base plate while reducing the overall height of the motor.

SUMMARY OF THE INVENTION

A spindle motor according to one illustrative preferred embodiment of the present invention is configured to rotate a disk about a center axis extending in an up-down direction. The spindle motor includes a rotary unit and a stationary unit. The rotary unit includes a rotor magnet. The stationary unit includes a stator opposed to the rotor magnet and a base plate. The base plate includes a flat plate-shaped member and a base body. The plate-shaped member is positioned around the center axis and made of a first kind of metallic material. The base body axially overlaps with the plate-shaped member and is made of a second kind of metallic material. The first kind of metallic material is larger in Young's modulus than the second kind of metallic material. The base body includes a cylindrical or substantially cylindrical bearing attachment portion and a bottom plate portion. The bearing attachment portion axially extends about the center axis. The bottom plate portion radially extends from a lower portion of the bearing attachment portion. The plate-shaped member is positioned below the bottom plate portion to contact the bottom plate portion. The plate-shaped member is fixed to the base body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Illustrative preferred embodiments of the present invention will now be described with reference to the drawings. In the following description, the direction parallel or substantially parallel to a center axis of a spindle motor will be referred to as "axial". The direction orthogonal or substantially orthogonal to the center axis of the spindle motor will be referred to as "radial". The direction running along an arc about the center axis of the spindle motor will be referred to as "circumferential". The shape and positional relationship of individual components will be described under the assumption that the axial direction is an up-down direction and further that the side of a stator with respect to a base plate is an upper side. However, such definition of the up-down direction is not intended to limit the in-use direction of the spindle motor and the disk drive apparatus according to the present invention.

In the following description, the term "parallel" includes both the terms "parallel" and "substantially parallel". Also, the term "orthogonal" includes both the terms "orthogonal" and "substantially orthogonal".

Figure 1:
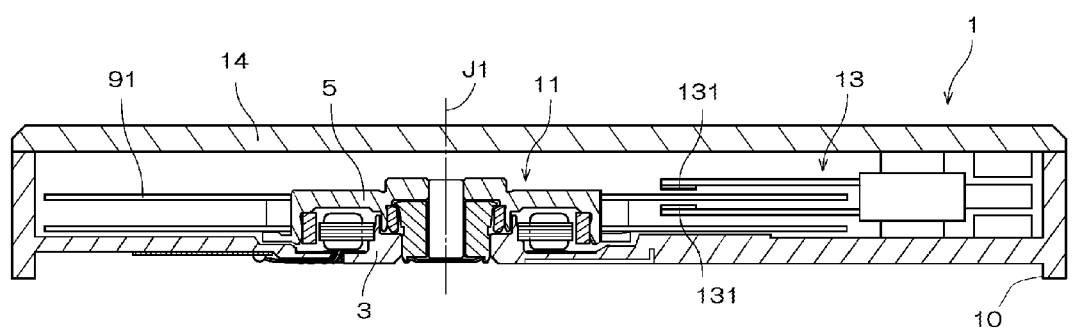
FIG. 1 is a vertical sectional view showing a disk drive apparatus according to a preferred embodiment of the present invention.

FIG. 1 is a vertical sectional view showing a disk drive apparatus 1 according to a preferred embodiment of the present invention. The disk drive apparatus 1 is an apparatus arranged to rotate, e.g., a magnetic disk 91, and performing at least one of information "reading" and/or "writing" tasks with respect to the magnetic disk 91. As shown in FIG. 1, the disk drive apparatus 1 preferably includes a spindle motor 11 (hereinafter referred to as "motor 11"), at least one magnetic disk 91, an access unit 13, a cover 14, and a spacer 92 (see FIGS. 2 and 3).

The motor 11 supports the magnetic disk 91 and rotates the magnetic disk 91 about a center axis J1. In the present preferred embodiment of the present invention, the number of magnetic disks 91 is preferably two, for example. The motor 11 preferably includes a base plate 3 extending in a direction orthogonal to the center axis J1. The upper portion of the base plate 3 is covered with the cover 14. The rotary unit of the motor 11, the magnetic disk 91 and the access unit 13 are accommodated within a housing defined by the base plate 3, and the cover 14. The access unit 13 makes a head 131 move along the recording surface of the magnetic disk 91 so as to perform at least one of information "reading" and/or information "writing" tasks with respect to the magnetic disk 91.

Figure 2:
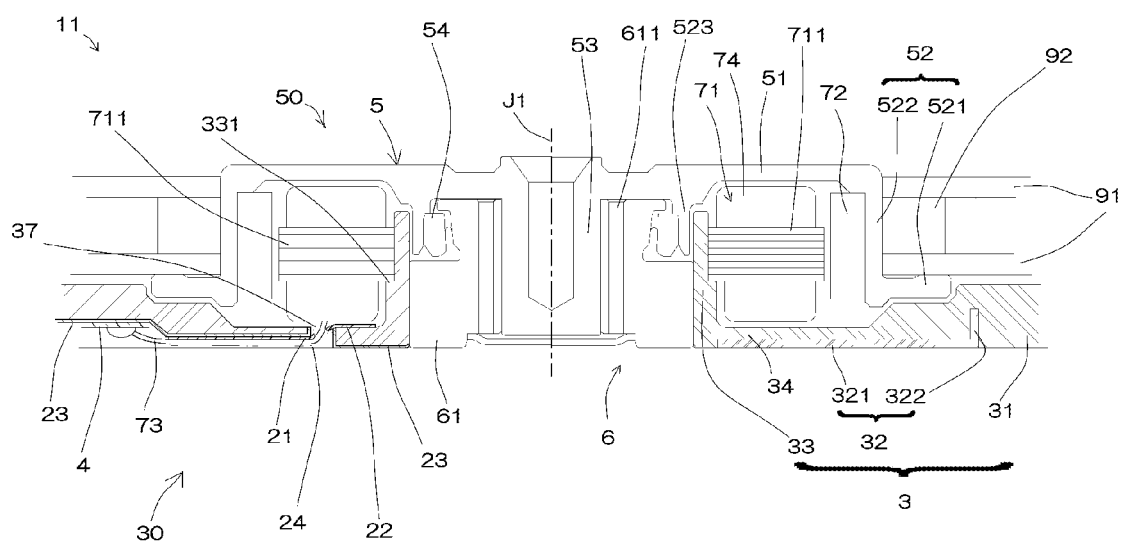
FIG. 2 is a vertical section view of a motor according to a preferred embodiment of the present invention.
Figure 3:
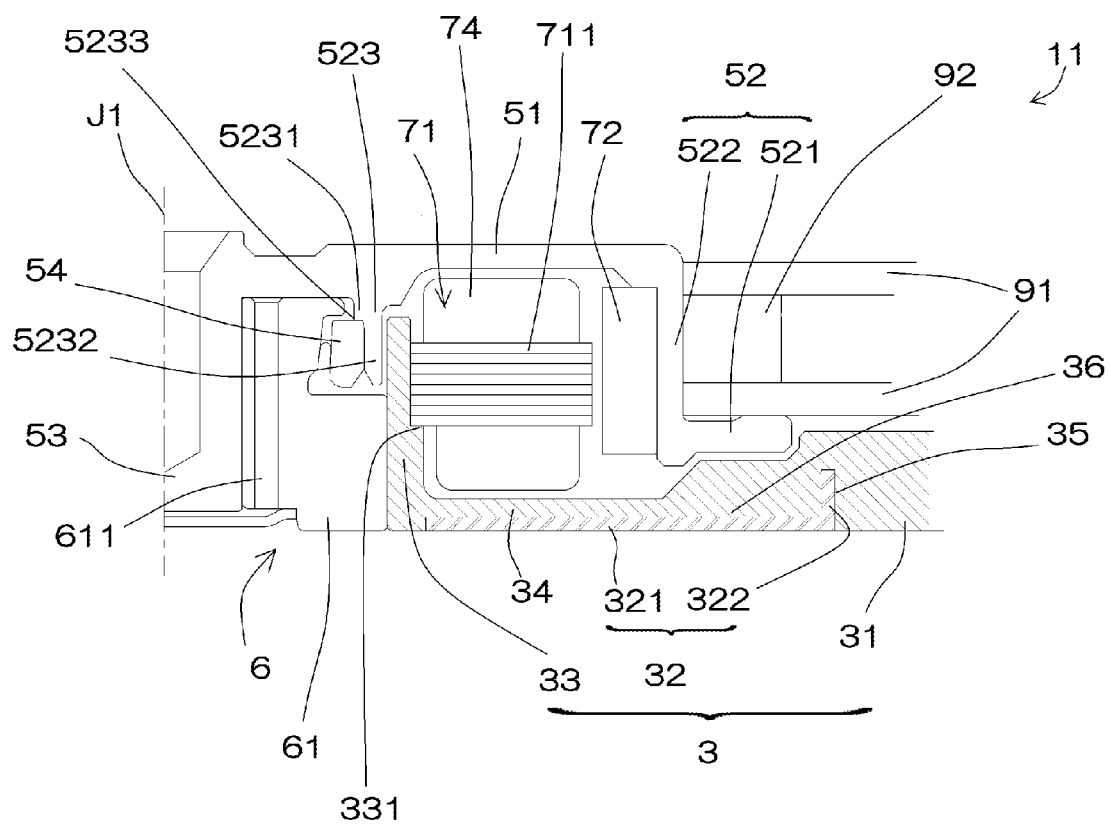
FIG. 3 is a partial vertical sectional view of the motor according to a preferred embodiment of the present invention.

FIG. 2 is a sectional view of the motor 11. FIG. 3 is a partial sectional view of the motor 11. As shown in FIGS. 1 and 3, the motor 11 is preferably of an outer rotor type. In the present preferred embodiment, the motor 11 is preferably a motor having three phases, namely a U-phase, a V-phase, and a W-phase. The motor 1 preferably includes a stationary unit 30 as a fixed assembly, a rotary unit 50 as a rotating assembly, and a fluidic dynamic-pressure bearing mechanism 6 (hereinafter referred to as "bearing mechanism 6"). By virtue of the bearing mechanism 6, the rotary unit 50 is rotatably supported with respect to the stationary unit 30 to rotate about the center axis J1 of the motor 11.

As shown in FIGS. 2 and 3, the rotary unit 50 preferably includes a rotor hub 5, a rotor magnet 72, and a spacer 92. The rotor hub 5 preferably includes a hub disc portion 51, a hub periphery portion 52, a shaft portion 53, a second hub cylinder portion 523, and a stopper 54. The hub periphery portion 52 preferably includes a ring-shaped hub flange portion 521 and a first hub cylinder portion 522. The hub disc portion 51 is a portion having a disc-like or substantially disc-like shape. The shaft portion 53 extending axially downward is preferably arranged at the center or substantially at the center of the hub disc portion 51. The shaft portion 53 preferably has a cylindrical or substantially cylindrical columnar shape and is preferably provided as a single monolithic member together with the hub disc portion 51. Alternatively, the shaft portion 53 may be provided independently of the hub disc portion 51.

The first hub cylinder portion 522 protrudes downward from the outer edge portion of the hub disc portion 51. The hub flange portion 521 extends radially outward from the lower portion of the first hub cylinder portion 522. The magnetic disk 91 is placed on the hub flange portion 521.

The spacer 92 is a member having an annular or a substantially annular shape. The spacer 92 is held on the outer surface of the first hub cylinder portion 522. The spacer 92 is arranged axially between the magnetic disks 91 and 91. This makes it possible to keep the gap between the adjoining magnetic disks 91 and 91 constant.

The second hub cylinder portion 523 preferably has a cylindrical or substantially cylindrical shape and extends axially downward from the hub disc portion 51. The second hub cylinder portion 523 is preferably arranged radially inward of the first hub cylinder portion 522. The lower end portion of the second hub cylinder portion 523 is positioned axially above the lower end portion of the first hub cylinder portion 522. As shown in FIG. 3, the inner surface of the second hub cylinder portion 523 preferably includes a small-diameter section 5231 and a large-diameter portion 5232. The radial distance between the small-diameter section 5231 and the center axis J1 is shorter than the radial distance between the large-diameter portion 5232 and the center axis J1. On the inner surface of the second hub cylinder portion 523, the small-diameter section 5231 is arranged axially above the large-diameter portion 5232. The small-diameter section 5231 is preferably connected to the large-diameter portion 5232 with a step portion 5233 interposed therebetween.

The stopper 54 is preferably a member having an annular or substantially annular shape. The stopper 54 is fixed to the inner surface of the second hub cylinder portion 523 by, for example, press-fitting, using an adhesive agent, etc. At least a portion of the stopper 54 is axially opposed to the hub disc portion 51 with a gap left therebetween. The upper end portion of the stopper 54 contacts the step portion 5233 of the second hub cylinder portion 523 and lies in an axially opposing relationship with the step portion 5233.

The rotor magnet 72 has a ring shape about the center axis J1. The rotor magnet 72 is arranged inside the first hub cylinder portion 522. The hub flange portion 521 is positioned radially outward of the lower portion of the rotor magnet 72. The rotor magnet 72 is arranged radially outward of a stator 71, to be described later. If an electric current is supplied from an external power source to the motor 11, torque is generated between the rotor magnet 72 and the stator 71.

As shown in FIG. 2, the stationary unit 30 preferably includes a bearing mechanism 6, a base plate 3, a stator 71, a wiring substrate 4, a first insulating sheet 21, and a second insulating sheet 22.

The bearing mechanism 6 is arranged radially inward of the bearing attachment portion 33 of the base plate 3, to be described later. The bearing mechanism 6 is preferably a fluidic dynamic-pressure bearing and preferably includes a lubricant and a sleeve 61. The sleeve 61 is a member having a cylindrical or substantially cylindrical shape. A portion of the shaft portion 53 is arranged within the through-hole of the sleeve 61. A portion of the outer surface of the shaft portion 53 is axially opposed to the inner surface of the through-hole of the sleeve 61. When the rotary unit 50 is rotated with respect to the stationary unit 30, the sleeve 61 supports the shaft portion 53 through the lubricant.

The sleeve 61 preferably includes a communication hole 611 extending through the sleeve 61 in the up-down direction. The sleeve 61 is axially opposed to the hub disc portion 51 with a gap left therebetween. The upper outer edge portion of the sleeve 61 extends radially outward and is radially opposed to the inner surface of the second hub cylinder portion 523 with a gap left therebetween. The upper outer edge portion of the sleeve 61 is axially opposed to at least a portion of the stopper 54 with a gap left therebetween. Thus, if the rotary unit 50 is axially separated from the stationary unit 30 by, for example, a shocking force applied to the motor 11, the stopper 54 comes into contact with the upper outer edge portion of the sleeve 61. For that reason, the rotary unit 50 is prevented from being separated from the stationary unit 30.

A portion of the outer surface of the sleeve 61 is radially opposed to the stopper 54 with a gap left therebetween. The distance between the outer surface of the sleeve 61 and the inner surface of the stopper 54 becomes gradually longer axially downwards. This makes it possible to prevent the lubricant from being leaked through a space between the outer surface of the sleeve 61 and the inner surface of the stopper 54.

Figure 4:
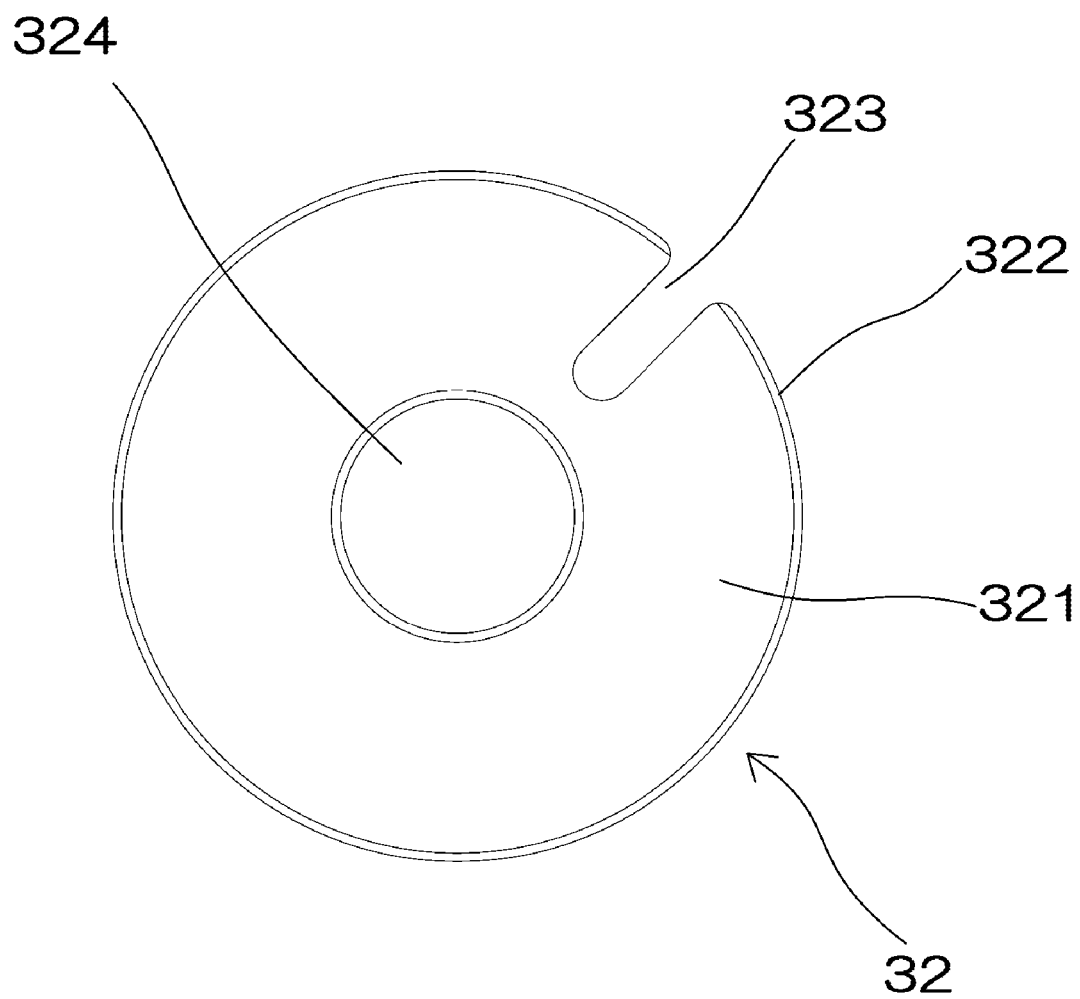
FIG. 4 is a plan view of a plate-shaped member according to a preferred embodiment of the present invention.

The base plate 3 preferably includes a plate-shaped member 32 and a base body 31. FIG. 4 is a plan view of the plate-shaped member 32. As shown in FIGS. 2, 3, and 4, the plate-shaped member 32 preferably has a flat shape and is positioned around the center axis J1. The plate-shaped member 32 preferably includes a radially-extending plate ring portion 321, a plate tube portion 322, and at least one plate cutout 323. When seen axially, the plate ring portion 321 has an annular or substantially annular shape.

The plate tube portion 322 has an axially-extending tubular shape and is positioned in the outer edge portion of the plate ring portion 321. When seen axially, the plate tube portion 322 has an annular or substantially annular shape. The axial dimension of the plate tube portion 322 is larger than the thickness of the plate ring portion 321.

A plate through-hole 324 is preferably arranged in the plate ring portion 321. The plate through-hole 324 axially extends through the plate ring portion 321.

The plate cutout 323 is arranged in the plate ring portion 321. The plate cutout 323 axially extends through the plate ring portion 321. The plate cutout 323 is arranged to extend from the radial inner side toward the radial outer side and is opened at the outer edge portion of the plate ring portion 321. The radial inner end portion of the plate cutout 323 is positioned radially outward of the plate through-hole 324 of the plate ring portion 321. When seen axially, the radial inner end portion of the plate cutout 323 preferably has an arc-like or substantially arc-like shape. At least a portion of the lower end portion of the bearing attachment portion 33, to be described later, is arranged in the plate through-hole 324.

As shown in FIGS. 2 and 3, the base body 31 preferably includes a bearing attachment portion 33 and a bottom plate portion 34. The bottom plate portion 34 is a portion having a flat or substantially flat shape. The bottom plate portion 34 has a smallest axial thickness in the base body 31. The bottom plate portion 34 extends radially outward from the lower portion of the bearing attachment portion 33.

The bearing attachment portion 33 is a portion having a tubular or substantially tubular shape. The bearing attachment portion 33 extends axially upward from the upper surface of the bottom plate portion 34. The bearing attachment portion 33 axially extends about the center axis J1. The upper end portion of the bearing attachment portion 33 is axially opposed to the hub disc portion 51. The inner surface of the bearing attachment portion 33 is radially opposed to the outer surface of the second hub cylinder portion 523. A shoulder portion 331 is arranged on the outer surface of the bearing attachment portion 33. At least a portion of the sleeve 61 is arranged within the bearing attachment portion 33. The inner surface of the bearing attachment portion 33, which defines a hole, is radially opposed to the outer surface of the sleeve 61.

The base body 31 preferably includes a first base recess portion 35, a second base recess portion 36, and at least one base lead-out hole 37. In the present preferred embodiment, the number of the base lead-out hole 37 is preferably one. The base lead-out hole 37 axially extends through the bottom plate portion 34. When the motor 11 is assembled, the base lead-out hole 37 axially overlaps with the plate cutout 323 of the plate-shaped member 32.

When seen axially, the contour of the edge of the base lead-out hole 37 is not limited to a particular shape and may be substantially circular or polygonal, if so desired. The base lead-out hole 37 may have a contour extending in at least one direction.

The first base recess portion 35 is arranged on the lower surface of the bottom plate portion 34 and is depressed axially upward. The first base recess portion 35 extends in the circumferential direction about the center axis J1. In the present preferred embodiment, when seen axially, the first base recess portion 35 has an annular or substantially annular shape. The depth (axial dimension) of the first base recess portion 35 is equal to or larger than the axial dimension of the plate tube portion 322.

The second base recess portion 36 is arranged on the lower surface of the bottom plate portion 34 and is depressed axially upward. The second base recess portion 36 is arranged radially inward of the first base recess portion 35 and is connected to the first base recess portion 35. When seen axially, the second base recess portion 36 has an annular or substantially annular shape. The outer surface of the lower end portion of the bearing attachment portion 33 defines the radial inner surface of the second base recess portion 36. The axial dimension (depth) of the second base recess portion 36 is preferably smaller than the axial dimension of the first base recess portion 35. The axial dimension of the second base recess portion 36 is equal to or larger than the thickness of the plate ring portion 321. The axial thickness of the portion of the plate-shaped member 32 contacting the bottom plate portion 34 is smaller than the axial thickness of the bottom plate portion 34.

When seen axially, the contour of the first base recess portion 35 and the second base recess portion 36 is preferably analogous or substantially analogous to the contour of the plate-shaped member 32. In the present preferred embodiment, when seen axially, the contour of the first base recess portion 35 and the second base recess portion 36 is identical or substantially identical with the contour of the plate-shaped member 32 including the plate tube portion 322. Therefore, when the motor 11 is assembled, the plate-shaped member 32 is positioned below the bottom plate portion 34 to contact the bottom plate portion 34 and is fixed to the base body 31. The plate-shaped member 32 contacts the bottom plate portion 34 at least in the axial direction. This makes it possible to enhance the rigidity of the base plate 3.

More specifically, when the plate-shaped member 32 is arranged on the lower surface of the bottom plate portion 34, the plate tube portion 322 is arranged within the first base recess portion 35. The upper end portion of the plate tube portion 322 contacts the bottom portion of the first base recess portion 35. Thus, the plate-shaped member 32 is axially located with respect to the base body 31. The plate tube portion 322 is arranged above the lower end portion of the base body 31.

The plate ring portion 321 is arranged within the second base recess portion 36. The radial inner surface of the plate ring portion 321 faces and contacts the radial inner surface of the second base recess portion 36. The radial outer surface of the plate ring portion 321 faces and contacts the radial outer surface of the second base recess portion 36. Thus, the plate ring portion 321 is radially located with respect to the base body 31.

The lower surface of the plate-shaped member 32 is preferably axially flush with or axially above the lower surface of the base body 31. In other words, the lower surface of the plate-shaped member 32 does not protrude axially below the lower surface of the base body 31. Therefore, even when the plate-shaped member 32 is attached to the base body 31, it is possible to prevent an increase in the axial dimension of the motor 11.

Preferably, the plate-shaped member 32 is fixed to the base body 31 by, for example, an adhesive agent. More specifically, the plate tube portion 322 is fixed to the first base recess portion 35 preferably by, e.g., an adhesive agent. When assembling the motor 11, an adhesive agent may be applied on at least one of the surface of the plate tube portion 322 and the inner surface of the first base recess portion 35. For example, an adhesive agent may be arranged within the first base recess portion 35 and then the plate tube portion 322 may be inserted into the first base recess portion 35. Alternatively, an adhesive agent may be applied on at least one of the radial inner and outer surfaces of the plate tube portion 322 and then the plate tube portion 322 may be arranged within the first base recess portion 35. Alternatively, after the plate tube portion 322 is arranged within the first base recess portion 35, an adhesive agent may be filled into a clearance defined by the plate tube portion 322 and the first base recess portion 35.

Similarly, the plate ring portion 321 is preferably fixed to the second base recess portion 36 by, e.g., an adhesive agent. Preferably, an adhesive agent is arranged on at least one of the plate ring portion 321 and the second base recess portion 36. For example, after an adhesive agent is applied on the surface of the plate ring portion 321, the plate ring portion 321 may be arranged within the second base recess portion 36. Alternatively, after an adhesive agent is applied inside the second base recess portion 36, the plate ring portion 321 may be arranged within the second base recess portion 36.

The plate-shaped member 32 may be fixed to the base body 31 by methods (such as, for example, welding, press-fitting, etc.) other than the adhesive agent fixing method. These methods may be used in combination with the adhesive agent fixing method.

The plate-shaped member 32 is preferably made of a first kind of metallic material. The plate-shaped member 32 can be obtained by, e.g., cutting stainless steel as the first kind of metallic material. For example, ferromagnetic stainless steel or non-magnetic stainless steel can be used as the material of the plate-shaped member 32. More specifically, austenite-based stainless steel (e.g., SUS303 or SUS304), martensite-based stainless steel (e.g., SUS420) or ferrite-based stainless steel (e.g., SUS430) can be used as the material of the plate-shaped member 32, for example.

Other kinds of stainless steel may be used as the material of the plate-shaped member 32, if so desired. Pure iron, rather than an alloy, may also be used as the material of the plate-shaped member 32. The material of the plate-shaped member 32 may be ferromagnetic metal or non-magnetic metal.

The plate-shaped member 32 may be formed by methods other than cutting (e.g., pressing, forging, etc.).

The base body 31 is preferably made of a second kind of metallic material. The first kind of metallic material is larger in Young's modulus than the second kind of metallic material. The base body 31 can be obtained by, e.g., casting aluminum as the second kind of metallic material. Instead of aluminum, magnesium or magnesium alloy may be used as the material of the base body 31. The meaning of "aluminum" is not limited to pure aluminum, but also includes aluminum alloys suitable for casting.

The base body 31 is preferably subjected to insulation processing. The base body 31 preferably includes a clad surface covered with an insulating film 23 and an exposed surface exposed from the insulating film 23. At least a portion of the inner surface of the bearing attachment portion 33 preferably includes an exposed surface. At least a portion of the surface of the base body 31 which contacts the plate-shaped member 32 is an exposed surface. Preferably, at least a portion of the lower surface of the base body 31 includes a clad surface. In this case, the below-mentioned wiring substrate 4 and the below-mentioned lead wires 73 contact the clad surface of the lower surface of the base body 31 so as to prevent short-circuiting.

As shown in FIGS. 2 and 3, the stator 71 is arranged around the bearing attachment portion 33. The stator 71 preferably includes a stator core 711 and coils 74.

The stator core 711 preferably includes a core-back (not shown) and a plurality of teeth (not shown). The core-back has a ring shape about the center axis J1. The bearing attachment portion 33 is inserted into the through-hole of the core-back and is preferably fixed to the inner surface of the core-back by, for example, press-fitting or bonding. The lower end portion of the stator core 711 contacts the shoulder portion 331 of the bearing attachment portion 33. Thus, the stator core 711 is axially located with respect to the bearing attachment portion 33. The teeth extend radially outward from the outer edge portion of the core-back. Each of the teeth preferably includes a radially-extending winding portion (not shown) and a tip end portion (not shown). Lead wires 73 are wound on the winding portions of the teeth so as to define the coils 74. In the present preferred embodiment, the coils 74 preferably have three phases, i.e., a U-phase, a V-phase, and a W-phase.

A plurality of lead wires 73 (preferably three, in the present preferred embodiment) is led out from the coils 74 of the respective phases. As stated above, the base lead-out hole 37 axially overlaps with the plate cutout 323. The lead wires 73 extend toward the base lead-out hole 37 from a position lying above the bottom plate portion 34 and existing radially inward of the center of the base lead-out hole 37. The lead wires 73 are led out into the plate cutout 323 through the base lead-out hole 37. Within the plate cutout 323, the lead wires 73 extend radially outward along the lower surface of the first insulating sheet 21, to be described later. The end portions of the lead wires 73 are soldered to a wiring substrate 4 (described in more detail below) at the radial outer side of the base lead-out hole 37.

Figure 5:
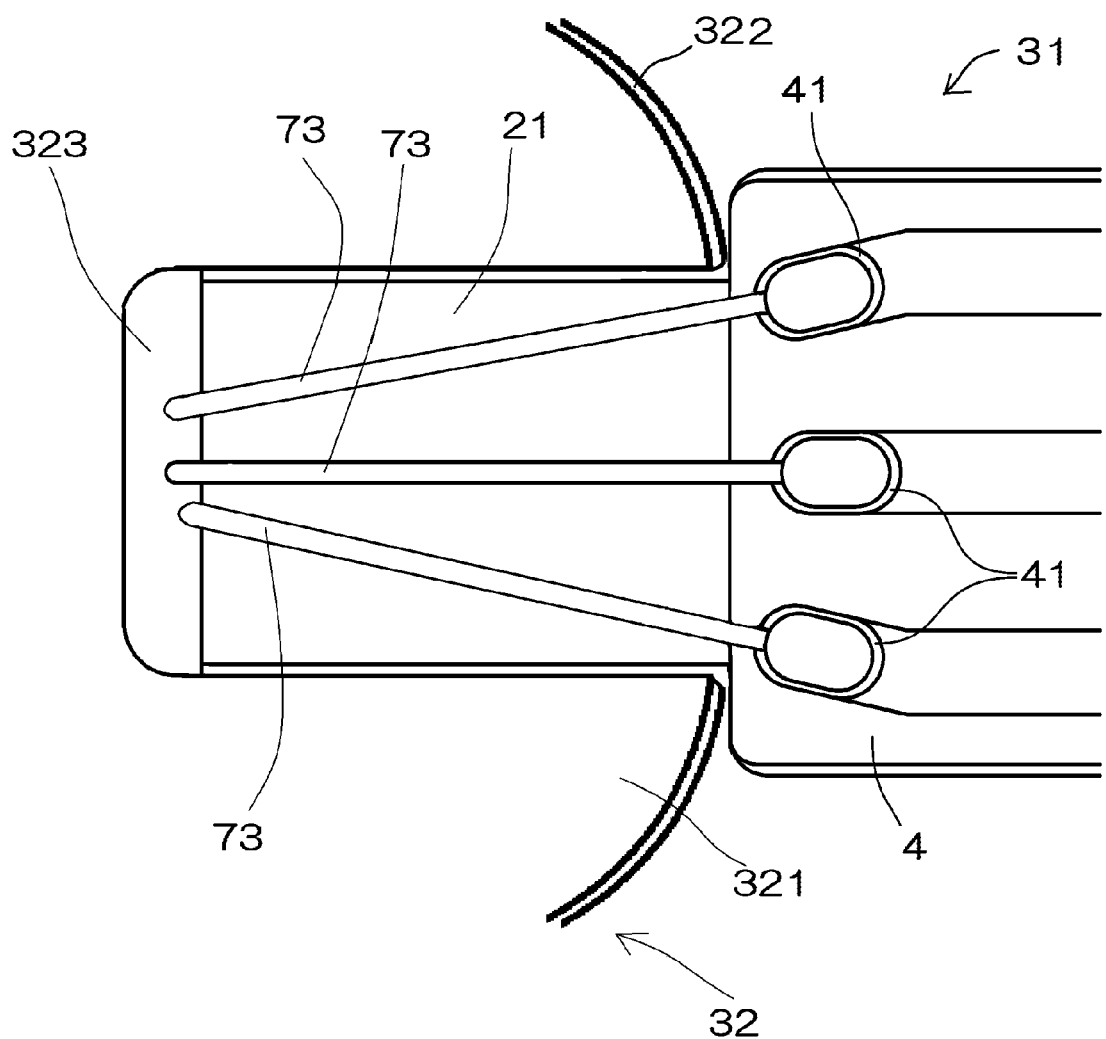
FIG. 5 is a partially enlarged view of a wiring substrate according to a preferred embodiment of the present invention.

A wiring substrate 4 is arranged on the lower surface of the base plate 3 and is connected to an external power source. FIG. 5 is a partially enlarged view of the wiring substrate 4. The wiring substrate 4 preferably includes at least one land portion 41. The land portion 41 is preferably a portion where a copper foil is exposed. The land portion 41 is arranged on the lower surface of the wiring substrate 4. In the present preferred embodiment, three land portions 41 are preferably provided. The respective lead wires 73 led out from the base lead-out hole 37 are connected to the respective land portions 41 by, e.g., solder (preferably including a lead-containing solder and a lead-free solder). Thus, the wiring substrate 4 is electrically connected to the coils 74. An electric current which drives the motor 11 is supplied from an external power source to the coils 74 via the wiring substrate 4.

A flexible printed circuit board can be taken as one preferred example of the wiring substrate 4.

As shown in FIG. 2, a first insulating sheet 21 is arranged on the lower surface of the base body 31. The first insulating sheet 21 is arranged between the lead wires 73 and the bottom plate portion 34. Moreover, the first insulating sheet 21 is arranged between the wiring substrate 4 and the bottom plate portion 34. Accordingly, even if an exposed surface exists on the lower surface of the base body 31, the lead wires 73 are prevented from contacting the lower surface of the base body 31 and becoming short-circuited.

The radial inner end portion of the first insulating sheet 21 is arranged radially inward of the axial lower edge of the plate cutout 323. The radial inner end portion of the first insulating sheet 21 is positioned between the inner surface defining the plate cutout 323 and the lead wires 73. Thus, the lead wires 73 are prevented from contacting the inner surface defining the plate cutout 323 and becoming short-circuited.

Moreover, the radial inner end portion of the first insulating sheet 21 extends into the base lead-out hole 37. The radial inner end portion of the first insulating sheet 21 is arranged between the lead wires 73 and the inner surface defining the base lead-out hole 37. For that reason, the lead wires 73 are prevented from contacting the inner surface defining the base lead-out hole 37 and becoming short-circuited.

In the present preferred embodiment, the plate-shaped member 32 is preferably not subjected to insulation processing.

However, the plate-shaped member 32 may be subjected to insulation processing and may be covered with an insulating film, if so desired. In this case, it is not necessary to provide the first insulating sheet 21 on the base body 31.

As shown in FIG. 2, a second insulating sheet 22 is preferably arranged on the upper surface of the base plate 3. The second insulating sheet 22 is fixed to the upper surface of the bottom plate portion 34 by, e.g., an adhesive agent, a sticky material, etc. In the present preferred embodiment, when seen axially, the second insulating sheet 22 has an annular or substantially annular shape. The second insulating sheet 22 is arranged radially outward of the bearing attachment portion 33 so as to surround the bearing attachment portion 33.

The second insulating sheet 22 is arranged between the base plate 3 and the coils 74. This prevents the bottom plate portion 34 from contacting the coils 74. Accordingly, the base plate 3 is electrically insulated from the coils 74. Since the second insulating sheet 22 is arranged between the bottom plate portion 34 and the coils 74, the bottom plate portion 34 can come close to the coils 74 axially. This further reduces the axial dimension of the motor 11.

At least a portion of the radial outer end portion of the second insulating sheet 22 is arranged within the base lead-out hole 37 to cover at least a portion of the inner surface of the base lead-out hole 37. Thus, the lead wires 73 contact the inner surface of the base lead-out hole 37 through the second insulating sheet 22. This prevents the lead wires 73 from directly contacting the inner surface of the base lead-out hole 37 and becoming short-circuited. In other words, the lead wires 73 are electrically insulated from the base plate 3.

Preferably, the contour of the second insulating sheet 22 corresponds to the upper surface of the bottom plate portion 34. For example, if the bottom plate portion 34 has an annular or substantially annular shape when seen axially, the contour of the second insulating sheet 22 may have an annular or substantially annular shape when seen axially. On the bottom plate portion 34, a plurality of second insulating sheets 22 may be arranged along the circumferential direction.

In the present preferred embodiment, an exposed portion may be provided on the inner surface, the axial upper edge portion, and the axial lower edge portion of the base lead-out hole 37. However, the inner surface, the axial upper edge portion, and the axial lower edge portion of the base lead-out hole 37 may be subjected to insulation processing to form an insulating film or to arrange an insulating sheet. In this case, it is possible to prevent the lead wires 73 from contacting the base plate 3 and becoming short-circuited.

The first insulating sheet 21 and the second insulating sheet 22 are made of an electrically insulating material, e.g., a resin such as, for example, polyethylene terephthalate (PET) or the like. The thickness of the first insulating sheet 21 and the second insulating sheet 22 is preferably larger than the thickness of the insulating film 23 and is smaller than the thickness of the land portions 41 of the wiring substrate 4. At least a portion of the surface of the base body 31 may be covered with a metal plating layer. In that case, the thickness of the first insulating sheet 21 is preferably larger than the thickness of the metal plating layer.

As described above, some portions of the lead wires 73 led out toward the lower surface of the base body 31 are accommodated within the plate cutout 323. The axial depth of the plate cutout 323 is larger than the sum of the thickness of the first insulating sheet 21 and the diameter of the lead wires 73. Thus, the lead wires 73 are prevented from protruding axially downward beyond the lower surface of the bottom plate portion 34. As a result, the axial thickness of the motor 11 is reduced. The diameter of the lead wires 73 stated above denotes a diameter of a cross section including a bare wire of each of the lead wires 73 and a protection film covering the bare wire.

Each of the lead wires 73 led out from the coils 74 preferably include a bare wire and a protection film (not shown) covering the bare wire. The protection film is made of an electrically insulating material. The protection film is easily damaged when contacting a highly rigid material such as metal or the like. In the present preferred embodiment, the lead wires 73 contact the first insulating sheet 21 and the second insulating sheet 22 whose rigidity is lower than the rigidity of metal defining the base plate 3. Thus, the protection films of the lead wires 73 are prevented from getting damaged. Even if the protection films of the lead wires 73 are damaged, there is no or substantially no possibility that the lead wires 73 contact the base plate 3. In particular, the first insulating sheet 21 and the second insulating sheet 22 are made of an electrically insulating material. Accordingly, any electric connection between the lead wires 73 and the base plate 3 is prevented.

As shown in FIG. 2, the stationary unit 30 preferably further includes an adhesive agent 24 as a sealing material. The adhesive agent 24 is not electrically conductive. The base lead-out hole 37 is sealed by the adhesive agent 24. This prevents a gas from flowing through the base lead-out hole 37. As a result, the air-tightness of the disk drive apparatus 1 is enhanced.

The lead wires 73 are fixed within the base lead-out hole 37 by the adhesive agent 24. As a consequence, the lead wires 73 are prevented from protruding axially downward beyond the lower surface of the bottom plate portion 34. Since the adhesive agent 24 covers the inner surface defining the base lead-out hole 37, the lead wires 73 are prevented from contacting the inner surface of the base lead-out hole 37 and becoming short-circuited.

In the present preferred embodiment, the adhesive agent 24 is preferably arranged not only within the base lead-out hole 37 but also within the plate cutout 323. This makes it possible to fix the lead wires 73 with the adhesive agent 24 over a broader area. For that reason, the lead wires 73 are prevented from protruding axially downward beyond the lower surface of the bottom plate portion 34 and the lower surface of the plate-shaped member 32.

In the present preferred embodiment, the axial depth of the plate cutout 323 is preferably larger than the sum of the thickness of the first insulating sheet 21, the diameter of the lead wires 73, and the application thickness of the adhesive agent 24. Thus, the adhesive agent 24 is prevented from extruding axially downward from the plate cutout 323.

Other sealing materials may be used in place of the adhesive agent. For example, a resin material other than the adhesive agent may be used as a sealing material.

While one preferred embodiment of the present invention has been described above, the present invention is not limited to the aforementioned preferred embodiment but may be modified in many different forms. In the following description, the same components as those of the foregoing preferred embodiment will be designated by like reference symbols with no description made thereon.

Figure 6:
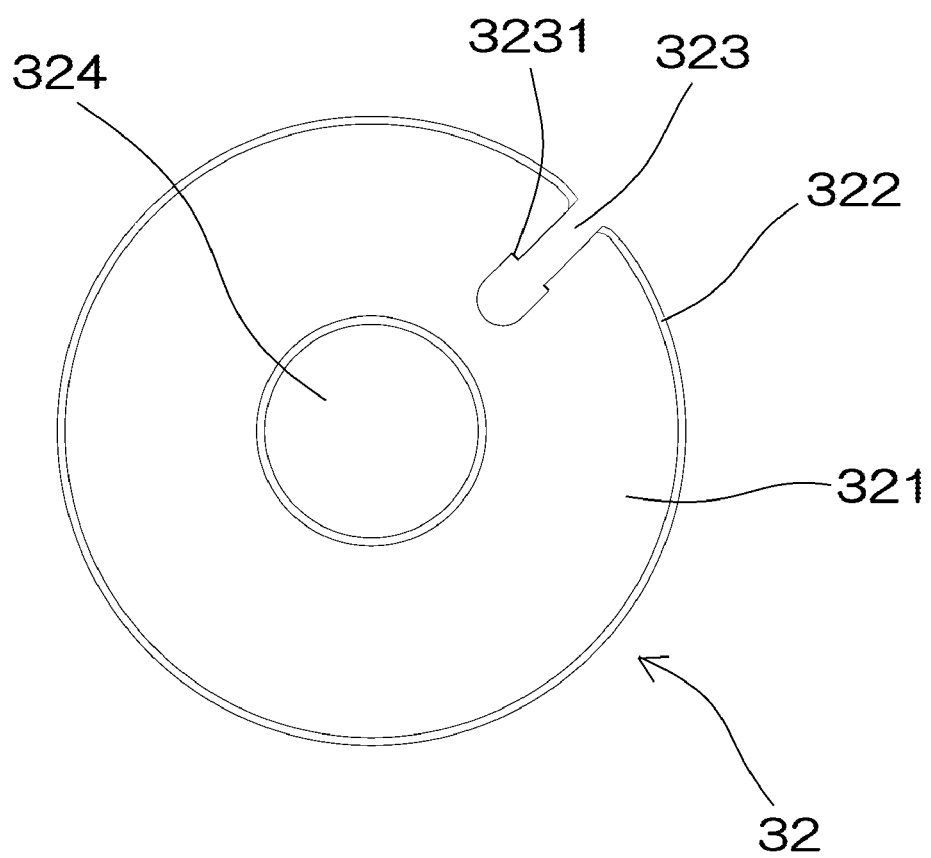
FIG. 6 is a plan view of a plate-shaped member according to one modified example of a preferred embodiment of the present invention.

For example, the shape of the plate cutout 323 is not limited to the aforementioned one. In another preferred embodiment of the present invention, a step portion 3231 may be provided in the plate cutout 323. FIG. 6 is a plan view of a plate-shaped member 32. As shown in FIG. 6, when seen axially, the plate cutout 323 may preferably include portions differing in circumferential width, which are arranged along the radial direction.

Figure 7:
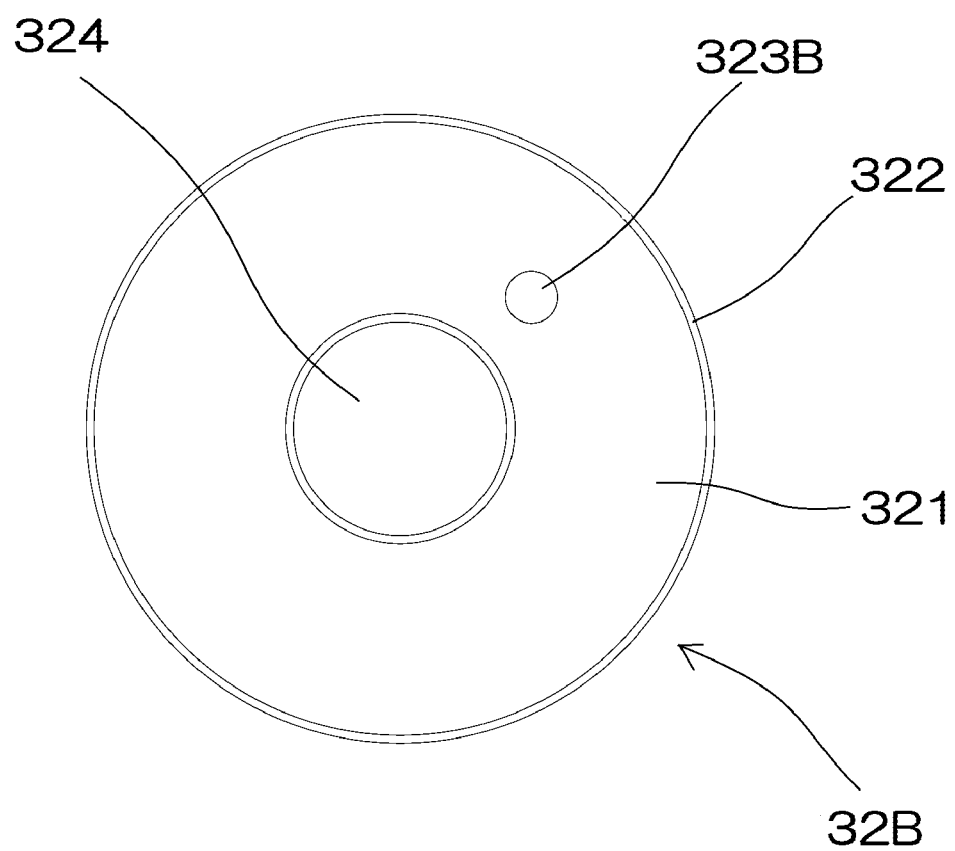
FIG. 7 is a plan view of a plate-shaped member according to another modified example of a preferred embodiment of the present invention.

The plate-shaped member 32 in accordance with another preferred embodiment of the present invention may include a plate hole 323B in place of the plate cutout 323. FIG. 7 is a plan view of a plate-shaped member 32B according to another modified example. As shown in FIG. 7, the plate-shaped member 32B preferably includes at least one plate hole 323B. The plate hole 323B axially extends through the plate ring portion 321. When the plate-shaped member 32B is arranged in the bottom plate portion 34, the plate hole 323B axially overlaps with the base lead-out hole 37. Thus, the lead wires 73 extending from the coils 74 are led out toward the lower surface of the base plate 3 through the base lead-out hole 37 and the plate hole 323B.

The number of the plate cutout 323 and the number of the plate hole 323B are not limited to one but may be plural. In this case, the plate-shaped member may include at least one plate cutout 323 and at least one plate hole 323B.

The number of the lead wires 73 led out from the plate cutout 323 (or the plate hole 323B) or the base lead-out hole 37 is not limited to three. For example, four lead wires, or any other desirable number of lead wires, may be led out from the plate cutout 323 (or the plate hole 323B) or the base lead-out hole 37. Each of the lead wires 73 may be led out from each of a plurality of plate cutouts 323 (or a plurality of plate holes 323B) or each of a plurality of base lead-out holes 37. The lead wires 73 may be led out from one base lead-out hole 37 and may be transferred to different plate cutouts 323 (or different plate holes 323B) or only one plate cutout 323 (or only one plate hole 323B). There may be a base lead-out hole 37 from which the lead wires 73 are led out and a base lead-out hole 37 from which the lead wires 73 are not led out. There may be a plate cutout 323 (or a plate hole 323B) from which the lead wires 73 are led out and a plate cutout 323 (or a plate hole 323B) from which the lead wires 73 are not led out.

The number of the land portions 41 may be appropriately changed in conformity with the number of the lead wires 73 to be connected to the land portions 41.

The plate tube portion 322 does not need to be tubular. For example, instead of the plate tube portion 322, a plurality of plate extension portions 322B may be arranged in the outer edge portion of the plate ring portion 321.

Figure 8:
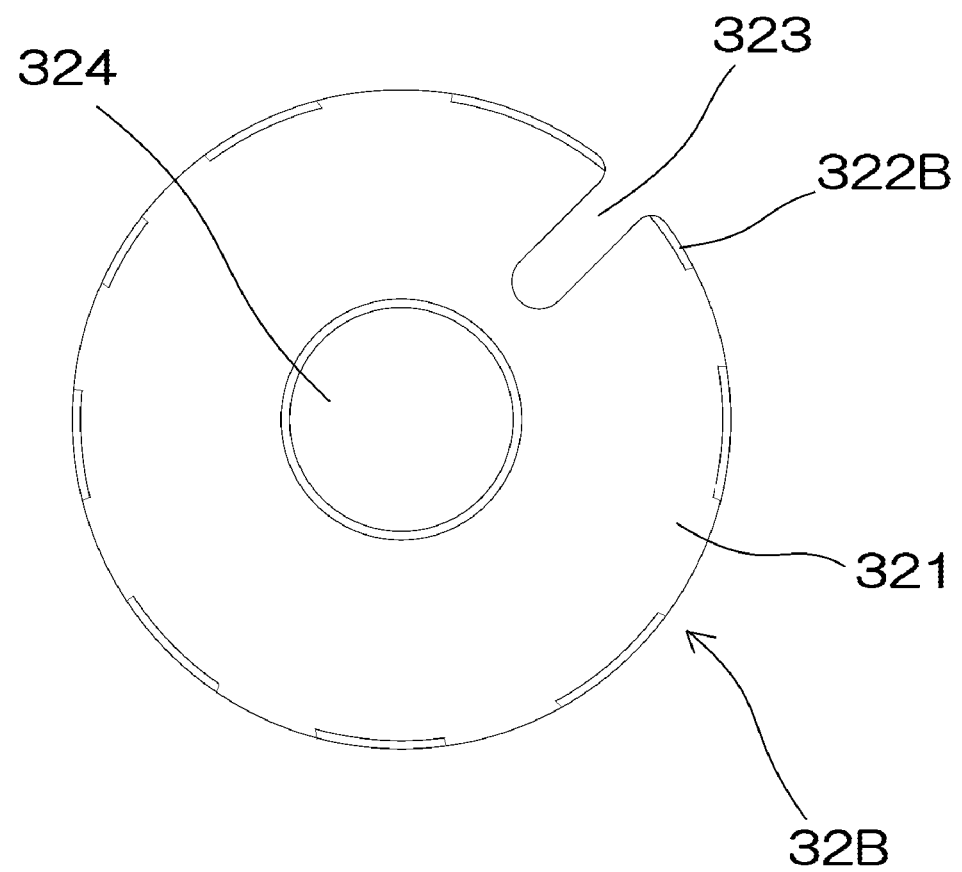
FIG. 8 is a plan view of a plate-shaped member according to a further modified example of a preferred embodiment of the present invention.

FIG. 8 is a plan view of a plate-shaped member according to a further modified example of a preferred embodiment of the present invention. A plurality of plate extension portions 322B extending in the axial direction and in the circumferential direction are arranged in the outer edge portion of the plate ring portion 321 along the circumferential direction. In this case, the bottom plate portion 34 preferably includes a plurality of first base recess portions 35B (not shown) corresponding to the plate extension portions 322B. The first base recess portions 35B are arranged side by side along the circumferential direction. The circumferential positions of the first base recess portions 35B are the same or substantially the same as the circumferential positions of the plate extension portions 322B. When the plate-shaped member 32B is attached to the base body 31, at least one of the plate extension portions 322B is arranged within each of the first base recess portions 35B. Therefore, when the plate-shaped member 32B is attached to the base body 31, the plate-shaped member 32B is prevented from moving in the circumferential direction with respect to the base body 31.

The plate extension portions 322B may be arranged within a ring-shaped first base recess portion 35. In this case, it is preferred that the plate-shaped member 32B be located with respect to the base body 31 by virtue of a jig or the like. Thereafter, the plate-shaped member 32B is preferably fixed to the base body 31 by an adhesive agent or the like.

At least one plate extension portion 322B may be arranged in only a portion of the edge of the plate cutout 323 or the plate hole 323B. In this case, the plate-shaped member 32B is prevented from rotating with respect to the base body 31.

Preferably, the plate extension portion 322B is fixed to the first base recess portion 35 or 35B, e.g., by an adhesive agent or by a method such as, for example, press-fitting or the like.

The plate tube portion 322 need not be necessarily arranged in the outer edge portion of the plate ring portion 321. At least one plate tube portion 322 may be arranged on the plate ring portion 321. In this case, the first base recess portion 35 of the bottom plate portion 34 is arranged within the second base recess portion 36 in conformity with the arrangement of the plate tube portion 322 or the plate extension portion 322B on the plate ring portion 321.

The plate extension portions 322B may be arranged not only in the outer edge portion of the plate ring portion 321 but also on the plate ring portion 321. For example, at least one plate extension portion 322B may be arranged on the plate ring portion 321. At least one plate extension portion 322B may extend in the axial direction and in the radial direction. A plurality of plate extension portions 322B may be arranged in a radial pattern. The arrangement and shape of the first base recess portion 35 or 35B formed in the base body 31 is set in conformity with the arrangement and shape of the plate extension portion 322B.

When seen axially, the contour of the plate-shaped member does not need to be annular or substantially annular. The contour of the plate-shaped member is not particularly limited and may be, e.g., polygonal or elliptical. The contour of the first base recess portion and the second base recess portion may be analogous to the contour of the plate-shaped member.

A portion of the wiring substrate 4 may be arranged on the lower surface of the base body 31 as a substitute of the insulating film 23. In this case, the wiring substrate 4 is defined by a plurality of layers. The wiring substrate 4 preferably includes a cover layer (not shown) arranged to insulate the land portions 41 from other portions. For example, a polyimide film or a photo solder resist film is used as the cover layer.

The adhesive agent 24 may be arranged on the lower surface of the base body 31. In this case, the first insulating sheet 21 is arranged on the adhesive agent 24 applied on the lower surface of the base plate 3.

The adhesive agent 24 is arranged on at least a portion of the lower surface of the base body 31. The wiring substrate 4 extends across the lower surface of the base body 31 on which the adhesive agent 24 is applied.

The shape of the base plate 3 or the rotor hub 5 is not limited to the aforementioned one but may be changed to many different shapes.

Even if the rotor hub 5 or the base plate 3 has different structures, it is still possible to apply the insulating structures such as the insulating sheets 21 and 22, the wiring substrate 4, and the adhesive agent 24. As an additional insulating structure, the insulating sheets may axially overlap with the wiring substrate 4.

Moreover, the wiring substrate 4 may not necessarily be the flexible printed circuit board. The wiring substrate 4 may be, e.g., a rigid substrate such as, for example, a connector or the like.

The spindle motor of various preferred embodiments of the present invention can be applied to different kinds of disk drive apparatuses. The disk drive apparatus may be the one that rotates a disk other than the magnetic disk, e.g., an optical disk. When rotating the optical disk, it is preferred that a rubber material be arranged in the portion of the rotor hub axially opposed to the optical disk.

According to the preferred embodiments of the present invention and the modifications thereof, it is possible to make the disk drive apparatus thinner in the axial direction. Accordingly, preferred embodiments of the present invention and modifications thereof are applicable to a spindle motor employed in, e.g., a disk drive apparatus for a thin notebook-type PC or a thin tablet-type PC.

In the aforementioned preferred embodiments of the present invention and modifications thereof, description has been made on a so-called shaft rotating type motor in which a sleeve belongs to a stationary unit with a shaft belonging to a rotary unit. However, the motor of preferred embodiments of the present invention and modifications thereof may alternatively be a so-called shaft fixing type motor in which a shaft belongs to a stationary unit with a sleeve belonging to a rotary unit.

The specific shapes of the respective components may differ from those shown in the respective figures of the subject application. The respective components of the embodiments and the modified examples described above may be appropriately combined unless a conflict arises.

The preferred embodiments of the present invention and the modifications thereof can find applications in, e.g., a spindle motor and a disk drive apparatus.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor for rotating a disk about a center axis extending in an up-down direction, comprising:
   a rotary unit including a rotor magnet; and
   a stationary unit including a stator opposed to the rotor magnet and a base plate; wherein
   the base plate includes a flat plate-shaped member positioned around the center axis and made of a first kind of metallic material and a base body axially overlapping with the plate-shaped member and made of a second kind of metallic material;
   the first kind of metallic material is larger in Young's modulus than the second kind of metallic material;
   the base body includes a cylindrical or substantially cylindrical bearing attachment portion axially extending about the center axis and a bottom plate portion radially extending from a lower portion of the bearing attachment portion; and
   the plate-shaped member is positioned below the bottom plate portion to contact the bottom plate portion and fixed to the base body.

2. The spindle motor of claim 1, wherein an axial thickness of a portion of the plate-shaped member contacting the bottom plate portion is smaller than an axial thickness of the bottom plate portion.

3. The spindle motor of claim 2, wherein the plate-shaped member is made of non-magnetic stainless steel or ferromagnetic stainless steel and the base body is made of aluminum.

4. The spindle motor of claim 1, wherein the plate-shaped member is made of non-magnetic stainless steel or ferromagnetic stainless steel and the base body is made of aluminum.

5. The spindle motor of claim 1, wherein the plate-shaped member is made of non-magnetic stainless steel or ferromagnetic stainless steel and the base body is a cast product.

6. The spindle motor of claim 1, wherein the plate-shaped member is fixed to the base body by an adhesive agent.

7. The spindle motor of claim 1, wherein the plate-shaped member includes a radially-extending plate ring portion and an axially-extending plate tube portion positioned in an outer edge portion of the plate ring portion, the plate tube portion arranged above a lower end portion of the base body.

8. The spindle motor of claim 7, wherein the base body includes a base recess portion depressed upward and the plate tube portion is positioned within the base recess portion.

9. The spindle motor of claim 8, wherein the plate tube portion is fixed within the base recess portion by an adhesive agent.

10. The spindle motor of claim 1, wherein the base body includes a base lead-out hole penetrating through the bottom plate portion, the plate-shaped member including at least one plate hole or at least one plate cutout, the base lead-out hole axially overlapping with the plate hole or the plate cutout, a lead wire extending from the stator and reaching a lower surface of the base body through the base lead-out hole and the plate hole or the plate cutout.

11. The spindle motor of claim 1, wherein the base body includes a surface including a clad surface covered with an insulating film and an exposed surface exposed from the insulating film.

12. The spindle motor of claim 11, wherein the exposed surface includes at least a portion of a surface of the base body contacting the plate-shaped member.

13. The spindle motor of claim 11, wherein the exposed surface includes at least a portion of an upper surface of the bottom plate portion.

14. The spindle motor of claim 11, wherein the exposed surface includes at least a portion of an inner circumferential surface of the bearing attachment portion.

15. The spindle motor of claim 1, wherein the bottom plate portion is a portion having a smallest axial thickness in the base body.

16. The spindle motor of claim 1, wherein the stator is fixed to the bearing attachment portion, and the rotary unit, the stator, the bottom plate portion and the plate-shaped member axially overlap with one another.

17. The spindle motor of claim 1, further comprising a bearing mechanism accommodated within the bearing attachment portion.

18. A 2.5 inch type disk drive apparatus having a thickness of about 7 mm or less, comprising:
   the spindle motor of claim 17;
   a cover arranged to cover an upper portion of the base plate; and
   at least one disk held in the rotary unit.

* * * * *